US012090489B2

(12) United States Patent
Williams et al.

(10) Patent No.: US 12,090,489 B2
(45) Date of Patent: Sep. 17, 2024

(54) METHOD AND APPARATUS FOR GUARDING AND COMPOUNDING MATERIAL WITH TWO ROLL MILL

(71) Applicant: Honeywell Federal Manufacturing & Technologies, LLC, Kansas City, MO (US)

(72) Inventors: Benjamin Douglas Williams, Shawnee, KS (US); James Peter Hickson, Overland Park, KS (US); Steven Todd LaPlant, Kansas City, MO (US); Phillip C. Davis, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 442 days.

(21) Appl. No.: 17/545,955

(22) Filed: Dec. 8, 2021

(65) Prior Publication Data

US 2023/0173501 A1 Jun. 8, 2023

(51) Int. Cl.
*B02C 4/28* (2006.01)
*B02C 4/02* (2006.01)

(52) U.S. Cl.
CPC ................ *B02C 4/286* (2013.01); *B02C 4/02* (2013.01)

(58) Field of Classification Search
CPC .................................. B02C 4/02; B02C 4/286
USPC .......................................................... 241/222
See application file for complete search history.

(56) References Cited

U.S. PATENT DOCUMENTS

| | | | | |
|---|---|---|---|---|
| 340,898 A * | 4/1886 | Mielcarek | B02C 4/286 | 241/135 |
| 2008/0135654 A1* | 6/2008 | Pryor | A47J 43/0716 | 241/37.5 |
| 2017/0112328 A1* | 4/2017 | Rayo Casco | B26D 7/0608 | |
| 2020/0307013 A1* | 10/2020 | Mokhefi | A47J 44/00 | |

* cited by examiner

*Primary Examiner* — Christopher L Templeton
*Assistant Examiner* — Fred C Hammers
(74) *Attorney, Agent, or Firm* — Hovey Williams LLP

(57) ABSTRACT

A tool for feeding material into a mill having a roller and forming a nip gap. The tool broadly comprises a baseplate, a guide plate, and a ram. The baseplate is configured to be positioned on the mill over the roller and forms a slot. The guide plate is configured to be positioned in the slot of the baseplate near the nip gap. The guide plate forms a chute for feeding the material into the nip gap. The ram is configured to be inserted into the chute to urge the material into the nip gap while preventing a user's fingers and other foreign objects from nearing the nip gap through the chute.

16 Claims, 5 Drawing Sheets

METHOD AND APPARATUS FOR GUARDING AND COMPOUNDING MATERIAL WITH TWO ROLL MILL

GOVERNMENT INTERESTS

This invention was made with Government support under Contract No.: DE-NA-0002839 awarded by the United States Department of Energy/National Nuclear Security Administration. The Government has certain rights in the invention.

BACKGROUND

Material compounding mills often include spinning rollers forming a nip gap into which material is loaded and compounded. The nip gap creates a safety hazard as loose clothing, gloves, fingers, hair, and other foreign objects can get drawn between the spinning rollers. Such foreign objects can also taint the material being compounded. Furthermore, it can be difficult to apply sufficient downward force to feed the material into the nip gap while respecting the safety hazard.

SUMMARY OF THE INVENTION

Embodiments of the present invention solve the above-mentioned problems and provide a distinct advance in the art of material compounding mills. More particularly, the present invention provides a tool that mitigates or eliminates safety hazards associated with material compounding mills.

An embodiment of the invention is a tool broadly comprising a baseplate, a number of spacers, a guide plate, and a ram. The tool may be used for safely and easily loading material into a mill and compounding the material.

The baseplate is configured to be positioned over rollers of a mill and includes a slot. The baseplate is sufficiently rigid to distribute vertical and lateral forces to the mill with minimal bending or deflection. The baseplate is also configured to be mounted to the mill via a number of baseplate mounting points.

The slot is located near a middle of the baseplate for positioning the guide plate over a nip gap formed by the rollers of the mill. The slot is sufficiently large to receive portions of the guide plate therein.

The spacers are mounting blocks, wedges, inserts, or other similar components configured to be positioned between the baseplate and the mill. The spacers are interchangeable or stacked with other spacers to achieve different spacing of the guide plate over the nip gap as needed.

The guide plate is positioned in or over the slot and includes a guide wall forming a chute. The guide plate may be interchangeable with other guide plates having a different guide wall or chute of different sizes for accommodating different types of materials and/or different rams.

The guide wall extends downward from a horizontal portion of the guide plate. The guide wall is configured to vertically align the ram in the chute to prevent lateral movement and rotation of the ram.

The ram is a gate-shaped component configured to be inserted into the chute. The ram includes a leading surface, a handle, and opposing stops.

The leading surface is configured to contact the material and may be substantially flat with filleted edges. Alternatively, the leading surface may have a convex shape. The leading surface may also include gnurling or other features for gripping the material.

The handle is positioned near a top of the ram for gripping the handle and applying a downward force to the ram. To that end, the handle may include ergonomic contours, gnurling, or high friction material such as rubber for improving a user's grip on the handle.

The opposing stops are configured to engage the guide plate and may be tabs, protrusions, collars, or other similar geometry. The stops prevent the ram from being inserted into the chute beyond a predetermined limit.

In use, the baseplate is mounted on the mill via the spacers. Alternatively, no spacers may be used if the resulting spacing of the baseplate above the rollers is adequate. The guide plate is then positioned in or over the slot of the baseplate so that the chute is aligned over the nip gap.

Material is then positioned in or over the chute. Additional ingredients such as cross-linking agents or fillers may be added to the material. The mill may also be turned on so that the rollers begin rotating.

The ram is then inserted into the chute to urge the material through the chute into the nip gap. To that end, a user may grab the ram via the handle and press the ram against the material with the leading surface of the ram. The guide wall should prevent the ram from rotating or moving laterally. As the ram presses the material into the nip gap, the rollers of the mill compress the material and draw the material through the nip gap.

The ram may be continued to be pushed downward until the stops contact the guide plate. This prevents the ram from contacting the rollers of the mill. At this point, most or all of the material should have advanced through the nip gap past the rollers of the mill. The ram may then be withdrawn from the chute. Additional material may then be fed into the mill as needed.

The above-described tool provides several advantages. For example, the tool facilitates loading material into the mill while preventing operator hands, clothing, gloves, and other foreign objects from being caught between the rollers of the mill. This protects the operator from injury and keeps foreign objects from being mixed with the material. The ram also makes material pressing easier than directly manipulating the material. The guide plate can also be replaced with other guide plates for accommodating different types of material. The spacers also accommodate different mills and in particular, rollers of different sizes.

Another embodiment of the invention is a tool broadly comprising a baseplate, a number of spacers, a guide plate, a ram, and a linkage system. The tool may be used for loading and compounding rubber or other material into a mill, particularly with repetition or where additional mechanical advantage is preferred.

The baseplate is configured to be positioned over the rollers of a mill and includes a slot. The baseplate is sufficiently rigid to distribute vertical and lateral forces to the mill with minimal bending or deflection. The baseplate is also configured to be mounted to the mill via a number of baseplate mounting points.

The spacers are mounting blocks, wedges, inserts, or other similar components configured to be positioned between the baseplate and the mill. The spacers are interchangeable or stacked with other spacers to achieve different spacing of the guide plate over the nip gap as needed.

The guide plate is positioned in or over the slot and includes a number of guide rollers. The guide plate also forms a chute in which the guide rollers are positioned. The guide plate may be interchangeable with other guide plates having different guide rollers or a chute of different sizes for accommodating different types of materials and/or different rams.

The ram is a gate-shaped component configured to be inserted into the chute. The ram includes a leading surface, a spring bar, and opposing collars.

The leading surface is configured to contact the material and may be substantially flat with filleted edges. Alternatively, the leading surface may have a convex shape. The leading surface may also include gnurling or other features for gripping the material.

The spring bar extends horizontally along an upper end of the ram. The spring bar is configured to be linked to springs or other biasing elements of the linkage system.

The opposing collars slidably engage vertical rails of the linkage system and vertically align the ram in the chute to allow only vertical movement of the ram (and hence prevent lateral movement and rotation of the ram). The opposing collars may also double as stops to prevent the ram from being inserted into the chute beyond a predetermined limit.

The linkage system drives the ram into the chute and broadly includes opposing vertical rails, a spring bar, a number of biasing elements, opposing links, and a lever. The linkage system may also include hydraulics, pneumatics, and electrical components including actuators and motors.

The vertical rails extend upward near sides of the ram and pass through the collars. The vertical rails may be cylindrical or may include grooves or other alignment features.

The spring bar extends horizontally between the vertical rails over the ram. The spring bar anchors the biasing elements opposite the spring bar of the ram.

The biasing elements are connected between the spring bar of the linkage system and the spring bar of the ram to provide a biasing force to the ram. The biasing elements may be coil springs, leaf springs, torsion springs, elastic material, or any other suitable biasing component.

The links connect the collars of the ram to the lever. Specifically, the links are pivotably connected to the collars and the lever at opposing ends. The links convert pivoting motion of the lever to vertical translation motion of the ram.

The lever is pivotably connected to the baseplate at first connection points and to the links at second connection points spaced from the first connection points. In one embodiment, the lever includes opposing pivot arms and a horizontally-extending handle.

In use, the baseplate is mounted on the mill via the spacers. Alternatively, no spacers may be used if the resulting spacing of the baseplate above the rollers is adequate. The guide plate is then positioned in or over the slot of the baseplate so that the chute is aligned over the nip gap.

Material may then be positioned in or over the chute. Additional ingredients such as cross-linking agents or fillers may be added to the material. The mill may also be turned on so that the rollers begin rotating.

The lever is then pulled so that the ram is drawn into the chute via the links and pushes the material through the chute into the nip gap. More specifically, a user may pull (or push) the lever in a downward arc, which presses the leading surface of the ram against the material. The vertical rails prevent the ram from rotating or moving laterally. As the ram presses the material into the nip gap, the rollers of the mill compress the material and draw the material through the nip gap.

The ram may be drawn downward until the collars contact the guide plate. This prevents the ram from contacting the rollers of the mill. Alternatively, the linkage system as a whole may reach the extent of its travel, which may be governed by a length of the links. At this point, most or all of the material should have advanced through the nip gap past the rollers of the mill. The lever is then pushed or pulled in an upward arc to withdraw the ram from the chute. Additional material may then be fed into the mill as needed.

The above-described tool provides several advantages. For example, the tool facilitates loading material into the mill while preventing operator hands, clothing, gloves, and other foreign objects from being caught between the rollers of the mill. This protects the operator from injury and keeps foreign objects from being mixed with the material. The linkage system makes material pressing easier than directly manipulating the material or using a hand-held ram such as the one described above. In particular, the lever provides a mechanical advantage and does not require the user to align the ram in the chute. The guide rollers minimize friction of the material as it is pressed into the nip gap. The guide plate can also be replaced with other guide plates for accommodating different types of material. The spacers also accommodate different mills and in particular, rollers of different sizes.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
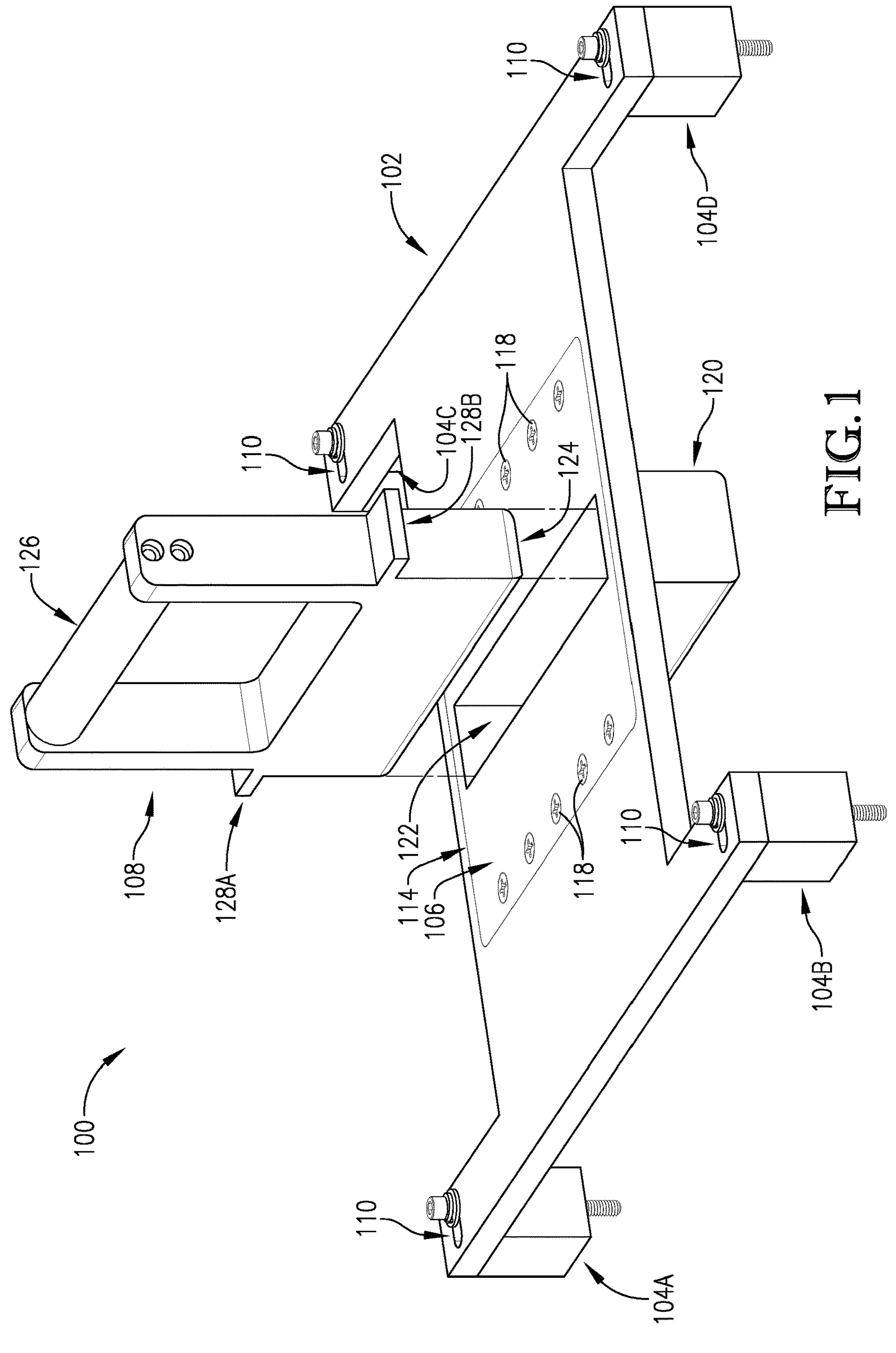
FIG. 1 is a perspective view of a tool constructed in accordance with an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
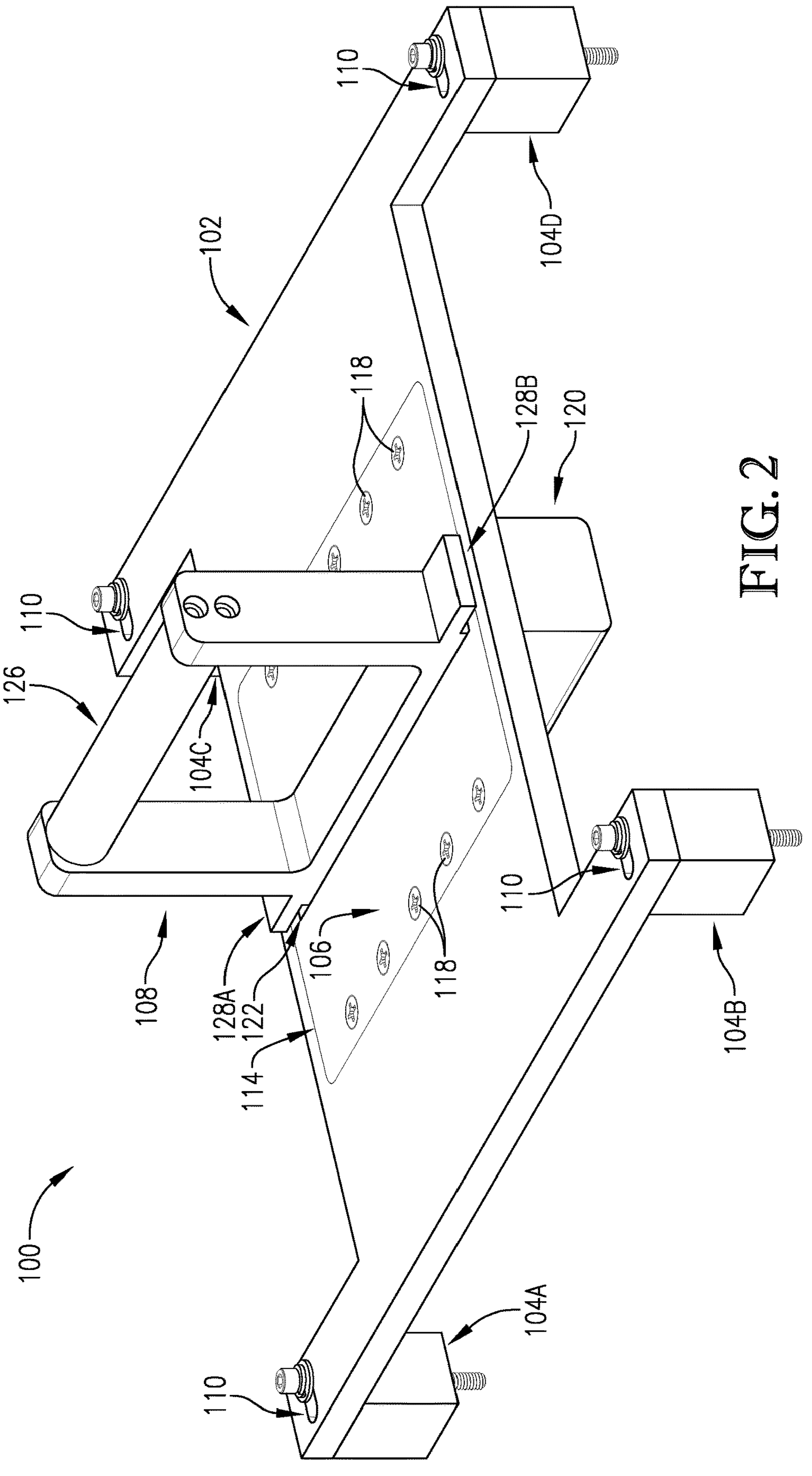
FIG. 2 is a perspective view of the tool of FIG. 1.
Figure 3:
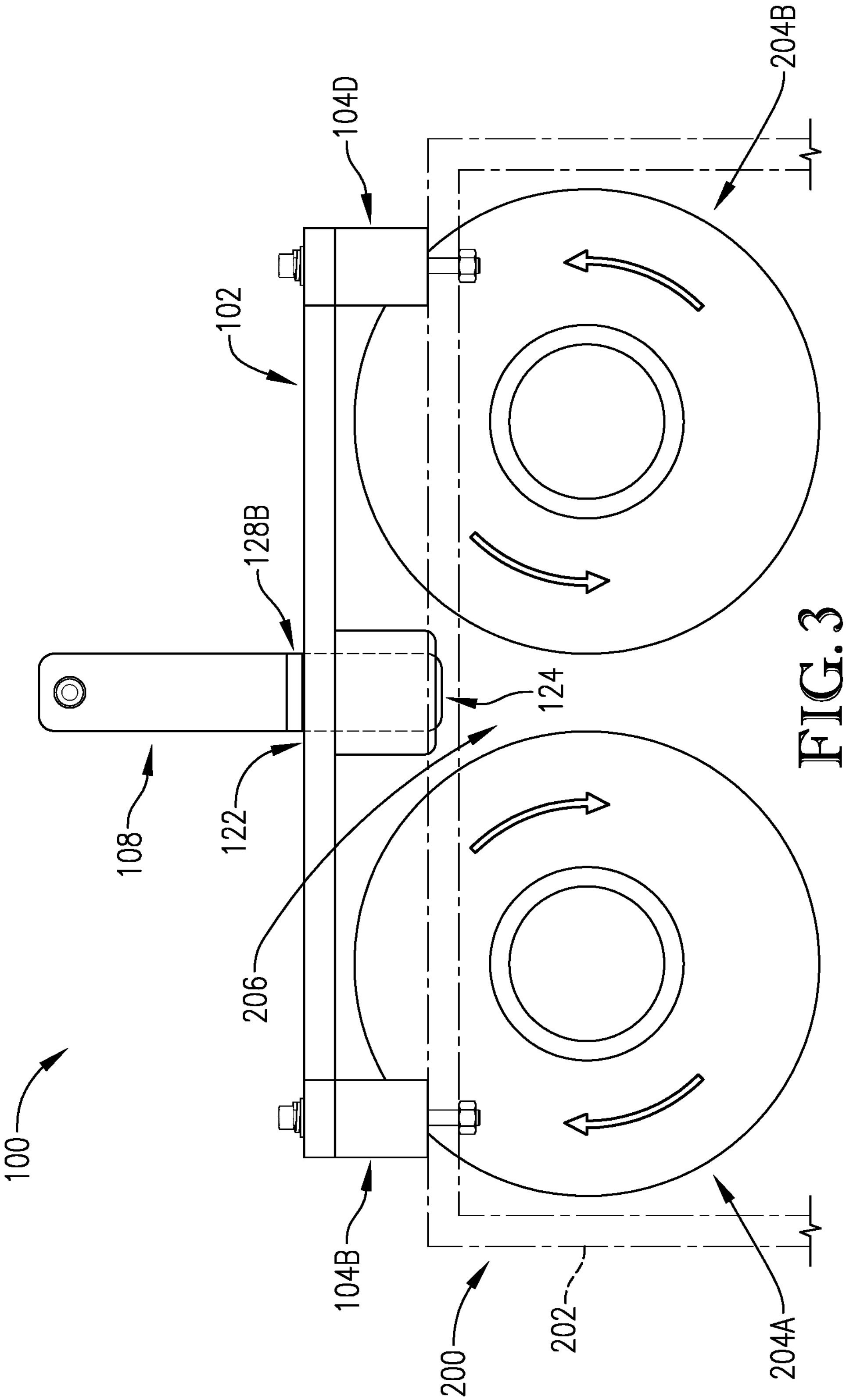
FIG. 3 is a side elevation view of the tool of FIG. 1.

Turning to the FIGS. 1-3, a tool 100 constructed in accordance with an embodiment of the invention is illustrated. The tool 100 broadly comprises a baseplate 102, a plurality of spacers 104A-D, a guide plate 106, and a ram 108. The tool 100 may be used for loading and compounding rubber or other material into a mill 200.

The mill 200 broadly comprises a frame 202 and opposing rollers 204A,B. The mill 200 is shown with two rollers, although a single roller opposite a stationary wall may also be used.

The frame 202 supports the rollers 204A,B and the tool 100. To that end, the frame 202 may include mounting points for securing the tool 100 thereto.

The opposing rollers 204A,B are oriented parallel to each other and are configured to rotate in opposite directions such that the portions of the opposing rollers 204A,B nearer to each other have downward velocity. The opposing rollers 204A,B form a nip gap 206 in which material and other ingredients such as cross-linking agents or fillers are loaded and then compounded between the opposing rollers 204A,B. The nip gap 206 is hazardous in that loose clothing, gloves, and other equipment, and fingers and hair can get caught therein. It is therefore an object of this invention to mitigate this safety hazard.

The baseplate 102 may be configured to be positioned over the rollers 204A,B and includes a plurality of baseplate mounting points 110, a plurality of guide plate mounting points, and a slot 114. The baseplate 102 may be sufficiently rigid to distribute vertical and lateral forces to the mill 200 with minimal bending or deflection.

The baseplate mounting points 110 may be spaced from the slot 114 to allow material to be fed unimpeded into the nip gap 206. To that end, the baseplate mounting points 110 may be positioned near lateral extents of the baseplate 102 such as near corners of the baseplate 102. The baseplate mounting points 110 may be or may include apertures for receiving mounting fasteners therethrough. The baseplate mounting points 110 may also be or include mounting bosses, interlocking geometry, or clamps for securing the baseplate 102 to the mill 200.

The guide plate mounting points may be positioned near the slot for securing the guide plate 106 over or in the slot 114. The guide plate mounting points may be or may include apertures for receiving fasteners therethrough. The guide plate mounting points may also be or include mounting bosses, interlocking geometry, or clamps for securing the guide plate 106 to the baseplate 102.

The slot 114 may be located near a middle of the baseplate 102 for positioning the guide plate 106 over the nip gap 206. The slot 114 may be sufficiently large to receive portions of the guide plate 106 therein.

The plurality of spacers 104A-D may be mounting blocks, wedges, inserts, or other similar components configured to be positioned between the baseplate 102 and the mill 200. The plurality of spacers 104A-D may include fastener through-holes for receiving mounting fasteners therethrough. The plurality of spacers 104A-D may be interchangeable or stacked with other spacers to achieve different spacing of the guide plate 106 over the nip gap 206. The plurality of spacers 104A-D may also include alignment geometry or interlocking geometry for ensuring a stable foundation under the baseplate 102.

The guide plate 106 may be positioned in or over the slot 114 and may include a plurality of guide plate mounting points 118 and a guide wall forming a chute 122. The guide plate 106 may be interchangeable with other guide plates having a different guide wall or chute of different sizes for accommodating different types of materials and/or different rams.

The guide plate mounting points 118 may be located near lateral extents of the guide plate 106 for aligning with the guide plate mounting points of the baseplate 102. The guide plate mounting points 118 may be or may include apertures for receiving fasteners therethrough. The guide plate mounting points 118 may also be or include mounting bosses, interlocking geometry, or clamps for securing the guide plate 106 to the baseplate 102.

The guide wall 120 may extend downward from a horizontal portion of the guide plate 106. The guide wall 120 may be configured to vertically align the ram 108 in the chute 122 to prevent lateral movement and rotation of the ram 108.

The ram 108 may be a gate-shaped component configured to be inserted into the chute 122. The ram 108 may have a leading surface 124, a handle 126, and opposing stops 128A,B. A horizontal cross section of the ram 108 may be complementary of a shape of the chute 122 so that the ram 108 fits in the chute 122 with minimal excess lateral space.

The leading surface 124 is configured to contact the material and may be substantially flat with filleted edges. Alternatively, the leading surface 124 may have a convex shape. The leading surface 124 may also include gnurling or other features for gripping the material.

The handle 126 may be positioned near a top of the ram 108 for gripping the handle 126 and applying a downward force to the ram 108. To that end, the handle 126 may include ergonomic contours, gnurling, or high friction material such as rubber for improving a user's grip on the handle 126.

The opposing stops 128A,B may be configured to engage the guide plate 106 and may be tabs, protrusions, collars, or other similar geometry. The stops 128A,B prevent the ram 108 from being inserted into the chute 122 beyond a predetermined limit.

Use of the tool 100 will now be described. First, the spacers 104A-D may be positioned on the mill 200. The baseplate 102 may then be positioned on the spacers 104A-D. Fasteners may then be inserted through the baseplate mounting points 110 and the fastener through-holes 116 of the spacers 104A-D to secure the baseplate 102 to the mill 200.

Alternatively, no spacers may be used if the resulting spacing of the baseplate 102 above the rollers 204A,B is adequate. In this case, the baseplate 102 may be mounted directly to the mill 200.

The guide plate 106 may then be positioned in or over the slot 114 of the baseplate 102 so that the chute 122 is aligned over the nip gap 206. The guide plate mounting points of the guide plate 106 and the guide plate mounting points 118 of the baseplate 102 should be aligned with each other. Fasteners may then be inserted through the guide plate mounting points of the guide plate 106 and the guide plate mounting points 118 of the baseplate 102 to secure the guide plate 106 to the baseplate 102.

Material may then be positioned in or over the chute 122. Additional ingredients such as cross-linking agents or fillers may be added to the material. The mill 200 may also be turned on so that the rollers 204A,B begin rotating.

The ram 108 may then be inserted into the chute 122 to urge the material through the chute 122 into the nip gap 206. To that end, a user may grab the ram 108 via the handle 126 and press the ram 108 against the material with the leading surface 124 of the ram 108. The guide wall 120 should prevent the ram 108 from rotating or moving laterally. As the ram 108 presses the material into the nip gap 206, the rollers 204A,B of the mill 200 compress the material and draw the material through the nip gap 206.

The ram 108 may be continued to be pushed downward until the stops 128A,B contact the guide plate 106. This prevents the ram 108 from contacting the rollers 204A,B of the mill 200. At this point, most or all of the material should have advanced through the nip gap 206 past the rollers 204A,B of the mill 200. The ram 108 may then be withdrawn from the chute 122. Additional material may then be fed into the mill 200 as needed.

The above-described tool 100 provides several advantages. For example, the tool 100 facilitates loading material into the mill 200 while preventing operator hands, clothing, gloves, and other foreign objects from being caught between the rollers 204A,B of the mill 200. This protects the operator from injury and keeps foreign objects from being mixed with the material. The ram 108 also makes material pressing easier than directly manipulating the material. The guide plate 106 can also be replaced with other guide plates for accommodating different types of material. The spacers 104 also accommodate different mills and in particular, rollers of different sizes.

Figure 4:
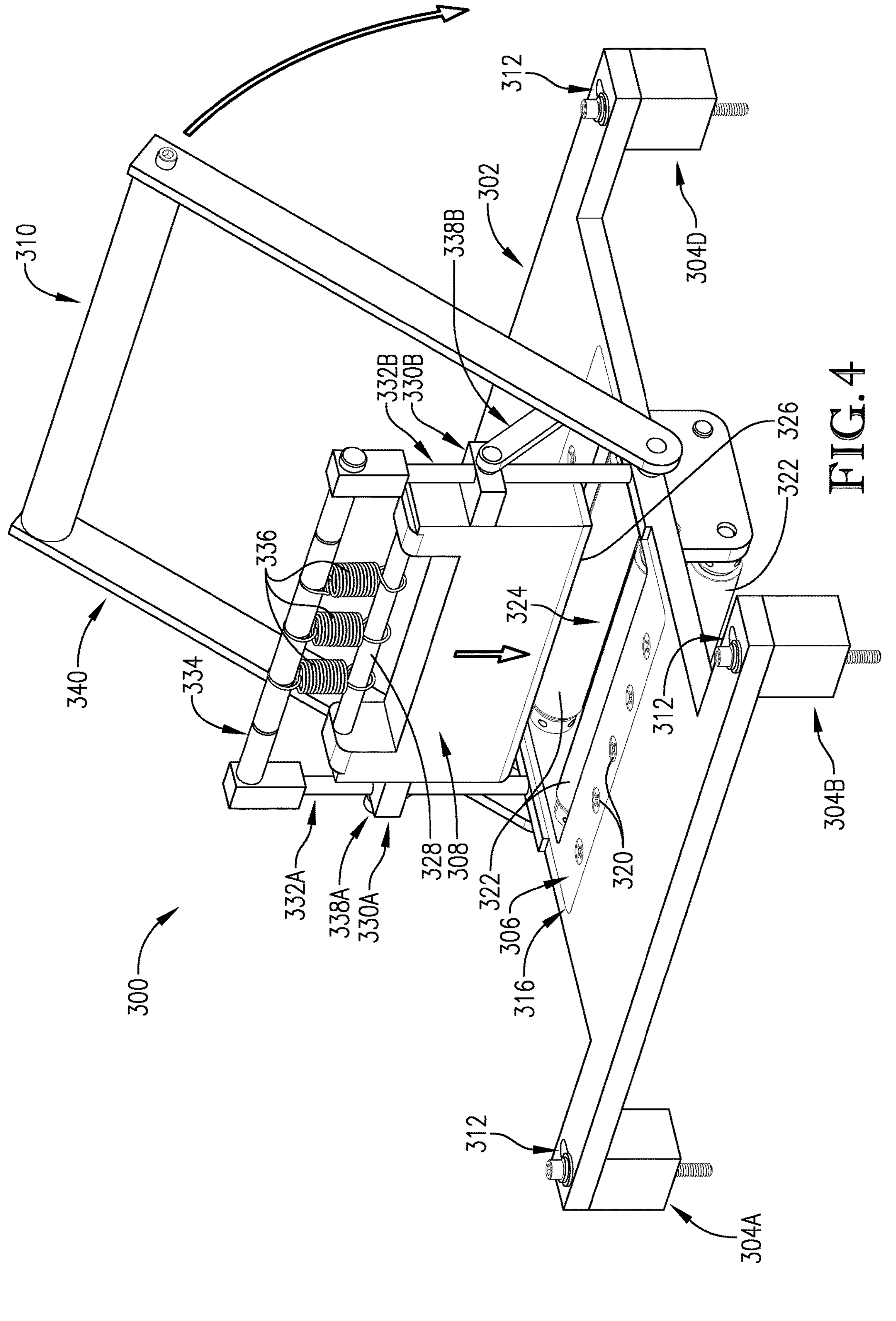
FIG. 4 is a perspective view of a tool constructed in accordance with another embodiment of the invention.
Figure 5:
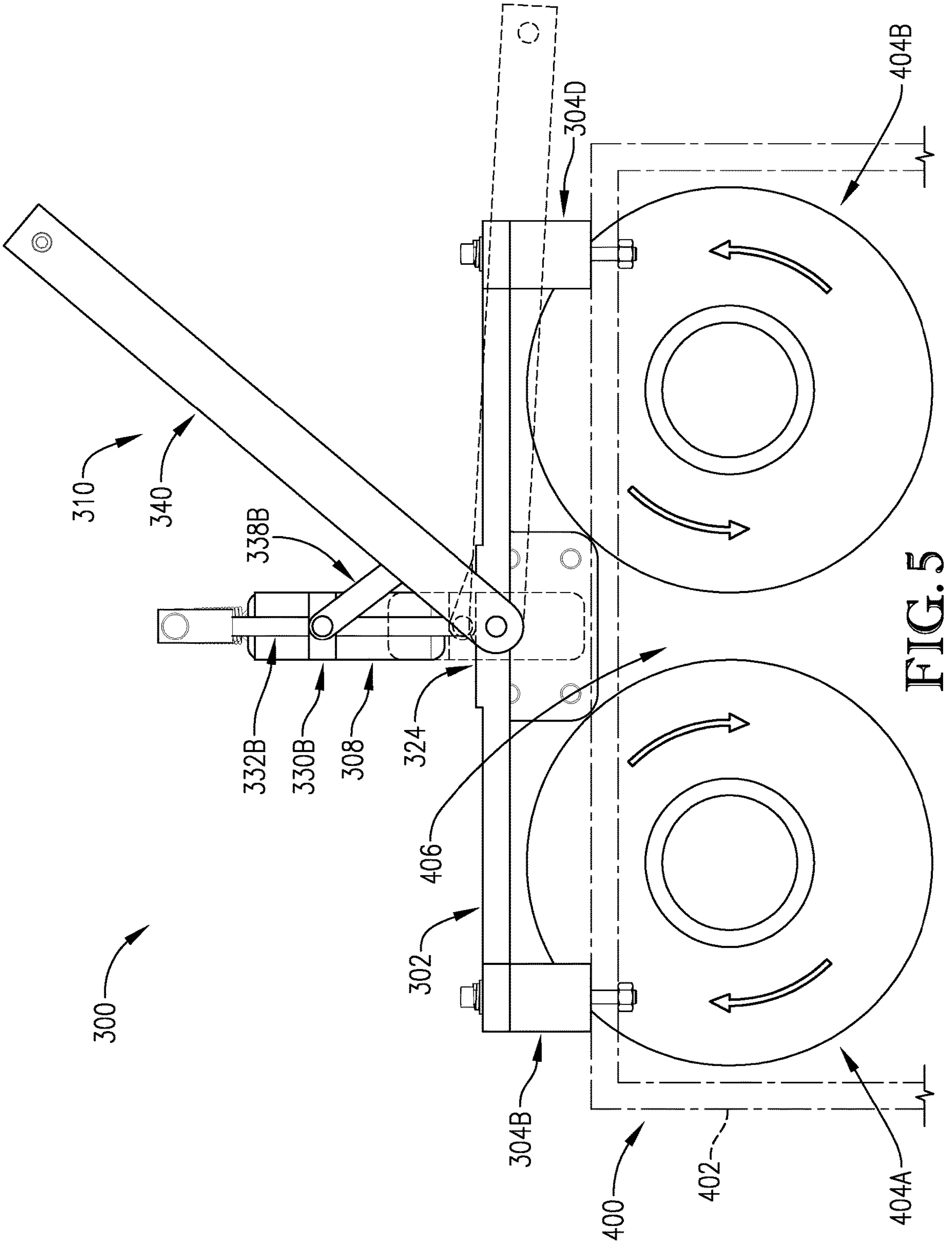
FIG. 5 is a side elevation view of the tool of FIG. 4.

Turning to FIGS. 4 and 5, a tool 300 constructed in accordance with another embodiment of the invention is illustrated. The tool 300 broadly comprises a baseplate 302, a plurality of spacers 304A-D, a guide plate 306, a ram 308, and a linkage system 310. The tool 300 may be used for loading and compounding material into a mill 400.

The mill 400 broadly comprises a frame 402 and opposing rollers 404A,B. The mill 400 is shown with two rollers, although a single roller opposite a stationary wall may also be used.

The frame 402 supports the rollers 404A,B and the tool 300. To that end, the frame 402 may include mounting points for securing the tool 300 thereto.

The opposing rollers 404A,B are oriented parallel to each other and are configured to rotate in opposite directions such that the portions of the opposing rollers 404A,B nearer to each other have downward velocity. The opposing rollers 404A,B form a nip gap 406 in which material and other ingredients such as cross-linking agents or fillers are loaded and then compounded between the opposing rollers 404A,B. The nip gap 406 is hazardous in that loose clothing, gloves, and other equipment, and fingers and hair can get caught therein. It is therefore an object of this invention to mitigate this safety hazard.

The baseplate 302 may be configured to be positioned over the rollers 404A,B and includes a plurality of baseplate mounting points 312, a plurality of guide plate mounting points, and a slot 316. The baseplate 302 may be sufficiently rigid to distribute vertical and lateral forces to the mill 400 with minimal bending or deflection.

The plurality of spacers 304A-D may be mounting blocks, wedges, inserts, or other similar components configured to be positioned between the baseplate 302 and the mill 400. The plurality of spacers 304A-D may include fastener through-holes for receiving mounting fasteners therethrough. The plurality of spacers 304A-D may be interchangeable or stacked with other spacers to achieve different spacing of the guide plate 306 over the nip gap 406. The plurality of spacers 304A-D may also include alignment geometry or interlocking geometry for ensuring a stable foundation under the baseplate 302.

The guide plate 306 may be positioned in or over the slot 316 and may include a plurality of guide plate mounting points 320 and a plurality of guide rollers 322. The guide plate 306 also forms a chute 324 in which the plurality of guide rollers 322 are positioned. The guide plate 306 may be interchangeable with other guide plates having different guide rollers or a chute of different sizes for accommodating different types of materials and/or different rams.

The ram 308 may be a gate-shaped component configured to be inserted into the chute 324. The ram 308 may have a leading surface 326, a spring bar 328, and opposing collars 330A,B. A horizontal cross section of the ram 108 may be complementary of a shape of the chute 324 so that the ram 108 fits in the chute 324 with minimal excess lateral space.

The leading surface 326 is configured to contact the material and may be substantially flat with filleted edges. Alternatively, the leading surface 326 may have a convex shape. The leading surface 326 may also include gnurling or other features for gripping the material.

The spring bar 328 extends horizontally along an upper end of the ram 308. The spring bar 328 is configured to be linked to springs or other biasing elements of the linkage system 310.

The opposing collars 330A,B slidably engage vertical rails of the linkage system 310 vertically align the ram 308 in the chute 324 to allow only vertical movement of the ram 308 (and hence prevent lateral movement and rotation of the ram 308). The opposing collars 330A,B may also double as stops to prevent the ram 308 from being inserted into the chute 324 beyond a predetermined limit.

The linkage system 310 drives the ram 308 into the chute 324 and broadly includes opposing vertical rails 332A,B, a spring bar 334, a plurality of biasing elements 336, opposing links 338A,B, and a lever 340. The linkage system may also include hydraulics, pneumatics, and electrical components including actuators and motors.

The vertical rails 332A,B extend upward near sides of the ram 308 and pass through the collars 330A,B. The vertical rails 332A,B may be cylindrical or may include grooves or other alignment features.

The spring bar 334 extends horizontally between the vertical rails 332A,B over the ram 308. The spring bar 334 anchors the biasing elements 336 opposite the spring bar 328 of the ram 308.

The biasing elements 336 are connected between the spring bar 334 of the linkage system 310 and the spring bar 328 of the ram 308 to provide a biasing force to the ram 308. The biasing elements 336 may urge the ram 308 upward to assist the ram 308 from being withdrawn from the chute 324 and/or to retain the ram 308 in an unactuated position when not in use. The biasing elements may be coil springs, leaf springs, torsion springs, elastic material, or any other suitable biasing component.

The links 338A,B connect the collars 330A,B of the ram 308 to the lever 340. Specifically, the links 338A,B are pivotably connected to the collars 330A,B and the lever 340 at opposing ends. The links convert pivoting motion of the lever 340 to vertical translation motion of the ram 308.

The lever 340 is pivotably connected to the baseplate 302 at first connection points and to the links 338A,B at second connection points spaced from the first connection points. In one embodiment, the lever 340 may include opposing pivot arms and a horizontally-extending handle.

Use of the tool 300 will now be described. First, the spacers 304A-D may be positioned on the mill 400. The baseplate 302 may then be positioned on the spacers 304A-D. Fasteners may then be inserted through the baseplate mounting points 312 and the fastener through-holes of the spacers 304A-D to secure the baseplate 302 to the mill 400.

Alternatively, no spacers may be used if the resulting spacing of the baseplate 302 above the rollers 404A,B is adequate. In this case, the baseplate 302 may be mounted directly to the mill 400.

The guide plate 306 may then be positioned in or over the slot 316 of the baseplate 302 so that the chute 324 is aligned over the nip gap 406. The guide plate mounting points 320 of the guide plate 306 and the guide plate mounting points of the baseplate 302 should be aligned with each other. Fasteners may then be inserted through the guide plate mounting points 320 of the guide plate 306 and the guide plate mounting points of the baseplate 302 to secure the guide plate 306 to the baseplate 302.

Material may then be positioned in or over the chute 324. Additional ingredients such as cross-linking agents or fillers may be added to the material. The mill 400 may also be turned on so that the rollers 404A,B begin rotating.

The lever 340 may then be pulled so that the ram 308 is drawn into the chute 324 via the links 338A,B and pushes the material through the chute 324 into the nip gap 406. More specifically, a user may pull (or push) the lever in a downward arc, which presses the leading surface of the ram 308 against the material. The vertical rails 332A,B should prevent the ram 308 from rotating or moving laterally. As the ram 308 presses the material into the nip gap 406, the rollers 404A,B of the mill 400 compress the material and draw the material through the nip gap 406.

The ram 308 may be continued to be drawn downward until the collars 330A,B contact the guide plate 306. This prevents the ram 308 from contacting the rollers 404A,B of the mill 400. Alternatively, the linkage system 310 as a whole may reach the extent of its travel, which may be governed by a length of the links 338A,B. At this point, most or all of the material should have advanced through the nip gap 406 past the rollers 404A,B of the mill 400. The lever 340 may then be pushed or pulled in an upward arc to withdraw the ram 308 from the chute 324. Additional material may then be fed into the mill 400 as needed.

The above-described tool 300 provides several advantages. For example, the tool 100 facilitates loading material into the mill 400 while preventing operator hands, clothing, gloves, and other foreign objects from being caught between the rollers 404A,B of the mill 400. This protects the operator from injury and keeps foreign objects from being mixed with the material. The linkage system 310 makes material pressing easier than directly manipulating the material or using a hand-held ram such as the one described above. In particular, the lever 340 provides a mechanical advantage and does not require the user to align the ram 308 in the chute 324. The guide rollers 322 minimize friction of the material as it is pressed into the nip gap 406. The guide plate 306 can also be replaced with other guide plates for accommodating different types of material. The spacers 304 also accommodate different mills and in particular, rollers of different sizes.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A tool for feeding material into a mill having a roller and forming a nip gap, the tool comprising:

a baseplate configured to be positioned on the mill over the roller, the baseplate forming a slot;

a guide plate configured to be positioned in the slot of the baseplate near the nip gap, wherein the guide plate forms a chute for feeding the material into the nip gap; and a ram configured to be inserted into the chute to urge the material into the nip gap, wherein the guide plate includes guide rollers configured to reduce friction of the material and the ram as the material and at least a portion of the ram pass through the chute.

2. The tool of claim 1, the guide plate being configured to vertically align the ram in the chute to prevent lateral movement and rotation of the ram.

3. The tool of claim 1, wherein the guide plate is removable from the baseplate.

4. The tool of claim 1, the guide plate being configured to be attached to the baseplate via a plurality of fasteners.

5. The tool of claim 1, the ram including a stop configured to engage the guide plate to prevent the ram from being inserted into the chute beyond a predetermined limit.

6. The tool of claim 1, the ram including a convex leading surface configured to press against the material.

7. The tool of claim 1, the ram further comprising a handle configured to apply a downward force to the ram.

8. The tool of claim 1, the baseplate including fastener holes configured for mounting the baseplate to the mill via a plurality of fasteners.

9. The tool of claim 1, further comprising a plurality of spacers configured to be positioned between the baseplate and the mill for spacing the guide plate from the nip gap.

10. A tool for feeding material into a mill having a roller and forming a nip gap, the tool comprising:

a baseplate configured to be positioned on the mill over the roller, the baseplate forming a slot;

a guide plate configured to be positioned in the slot of the baseplate near the nip gap, wherein the guide plate forms a chute for feeding the material into the nip gap;

a ram configured to be inserted into the chute to urge the material into the nip gap; and a linkage system configured to urge the ram into the chute, wherein the linkage system includes vertical rails configured to vertically align the ram in the chute to prevent lateral movement and rotation of the ram, and wherein the linkage system includes a crossbar extending between the vertical rails and a spring connected between the crossbar and the ram such that the spring is configured to bias the ram toward a predetermined position.

11. The tool of claim 10, the linkage system including a lever arm configured to be urged in a downward arc to draw the ram downward.

12. The tool of claim 10, the ram including collars aligned on the vertical rails, the linkage system being configured to prevent the ram from being inserted into the chute beyond a predetermined limit.

13. The tool of claim 10, the guide plate including guide rollers configured to reduce friction of the material and the ram as the material and at least a portion of the ram pass through the chute.

14. The tool of claim 10, wherein the guide plate is removable from the baseplate.

15. The tool of claim 10, the ram including a convex leading surface configured to press against the material.

16. A tool for feeding material into a mill having a roller and forming a nip gap, the tool comprising:

- a baseplate configured to be positioned on the mill over the roller, the baseplate forming a slot;
- a plurality of spacers configured to be positioned between the baseplate and the mill;
- a guide plate configured to be positioned in the slot of the baseplate near the nip gap, the guide plate forming a chute for feeding the material into the nip gap and including a plurality of guide rollers configured to reduce friction of the material as the material passes through the chute; and
- a ram configured to be inserted into the chute to urge the material into the nip gap, the ram including:
  - a handle configured to apply a downward force to the ram;
  - a stop configured to engage the guide plate to prevent the ram from being inserted into the chute beyond a predetermined limit; and
  - a convex leading surface configured to press against the material.

* * * * *